Patented Oct. 13, 1931

1,827,150

UNITED STATES PATENT OFFICE

WINFRID HENTRICH, OF WIESDORF-ON-THE-RHINE, GERMANY, ASSIGNOR TO GENERAL ANILINE WORKS, INC., OF NEW YORK, N. Y., A CORPORATION OF DELAWARE

PROCESS OF DYEING ORGANIC CELLULOSE ESTERS

No Drawing. Original application filed February 4, 1927, Serial No. 166,013. Patent No. 1,695,654, and in Germany February 26, 1926. Divided and this application filed October 18, 1927. Serial No. 227,052.

I have invented new and useful improvements in processes of dyeing organic cellulose esters.

My invention consists in the use of certain classes of azo dyestuffs for the dyeing of organic cellulose ester products such as cellulose formate, cellulose acetate, etc.

Whereas only very few mono azo dyestuffs show any affinity for organic cellulose esters, I have found that the products which are obtained by coupling diazo compounds of dinitro amino phenols or their derivatives with unsulfonated and non-carboxylated amino-naphthols in the presence of an agent capable of binding mineral acids such as sodium carbonate and sodium acetate, dye readily cellulose esters. The dyes so obtained dye brownish-red, brown, and violet to black shades which are characterized by their remarkable fastness properties, especially their fastness to washing and wetting. It is of especial importance that now for the first time, by the use of certain of these dyes, acetate silk may be dyed deep black colors directly by means of water-soluble dyestuffs from a neutral or slightly acid bath, i. e., a non-alkaline bath. By diazotizing and developing the dyes upon the fibers the shades are deepened and the fastness properties, especially the overcolor and light fastness properties, are improved.

In order to illustrate further my invention, the following example is given, it being understood that the invention is not confined to this example:

*Example:* 5 parts of the dyestuff prepared by coupling diazotized 4.6-dinitro-2-amino-1-hydroxy-benzol with 1-amino-8-hydroxy-naphthalene in the presence of sodium carbonate, said dyestuff having the following formula:

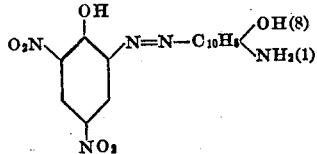

are dissolved in 3000 parts of hot water. 100 parts of cellulose acetate threads are entered into the hot dye bath and kept therein for about ¾ hour at 70° C. The skeins are squeezed out, rinsed and dried in the usual way. Deep black shades of excellent fastness properties are obtained.

This application is a division of my U. S. Patent 1,695,654, dated December 18, 1928, (application filed February 4, 1927, Serial No. 166,013).

I claim:

1. Process for dyeing cellulose esters which comprises contacting the same with a non-alkaline aqueous solution of a dyestuff substantially identical with a dyestuff obtainable by coupling the diazo-compound of a dinitro-amino phenol with an unsulfonated and non-carboxylated amino naphthol in the presence of an agent capable of binding mineral acids.

2. Process for dyeing cellulose esters which comprises contacting the same with a non-alkaline aqueous solution of a dyestuff having most probably the formula:

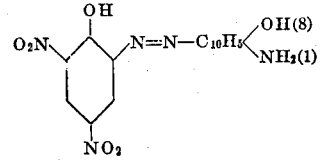

3. Process for dyeing cellulose esters which comprises contacting the same with a non-alkaline aqueous solution of a dyestuff substantially identical with a dyestuff obtainable by coupling a diazo-compound of a dinitro-amino phenol with an unsulfonated and non-carboxylated amino-naphthol in the presence of an agent capable of binding mineral acids and further diazotizing and developing said dyestuff upon the fiber.

In testimony whereof I have hereunto set my hand.

WINFRID HENTRICH.